United States Patent [19]

Leenslag et al.

[11] Patent Number: 5,587,414
[45] Date of Patent: Dec. 24, 1996

[54] COMPATIBILISING AGENTS

[75] Inventors: Jan W. Leenslag, Tremelo; Hans G. G. Verbeke, Linden, both of Belgium

[73] Assignee: Imperial Chemical Industries PLC, London, England

[21] Appl. No.: 481,728

[22] Filed: Jun. 7, 1995

Related U.S. Application Data

[60] Division of Ser. No. 321,507, Oct. 12, 1994, which is a continuation-in-part of Ser. No. 187,577, Jan. 27, 1994, abandoned.

[30] Foreign Application Priority Data

Nov. 11, 1993 [GB] United Kingdom .................. 9323288

[51] Int. Cl.⁶ ........................... C08K 5/09; C08K 5/098
[52] U.S. Cl. ...................... 524/394; 524/398; 524/399; 252/182.24; 252/182.2
[58] Field of Search ........................ 524/394, 398, 524/399; 252/182.24, 182.2

[56] References Cited

U.S. PATENT DOCUMENTS

| | | |
|---|---|---|
| 3,300,431 | 1/1967 | Ueno et al. . |
| 3,519,478 | 7/1970 | Howell et al. ......................... 117/155 |
| 3,870,665 | 3/1975 | Diehr et al. . |
| 3,972,846 | 8/1976 | Mori et al. . |
| 4,257,995 | 3/1981 | McLaughlin et al. ................... 264/122 |
| 4,373,081 | 2/1983 | Nachtkamp et al. ...................... 528/45 |
| 4,490,518 | 12/1984 | Fuzesi et al. ............................ 527/401 |
| 4,539,218 | 9/1985 | Geist ......................................... 427/27 |
| 5,283,311 | 2/1994 | Narayan ..................................... 528/49 |

FOREIGN PATENT DOCUMENTS

| | | |
|---|---|---|
| 0510437 | 10/1992 | European Pat. Off. . |
| 46-18016 | 5/1971 | Japan . |

OTHER PUBLICATIONS

"Reactions of Acetoacetic Ester Blocked Cyclohexyl Isocyanate", Zeno W. Wicks, Jr. and Kuang–Jong Wu, *J. Org. Chem.*, 1980, 45, pp. 2446–2448.

"Phenylisocyanation & Bromination reactions of Lanthanide –Diketoesters", G. Shankar and S. K. Ramalingam, *Indian Journal of Chemistry*, vol. 25A, Jan. 1986, pp. 94–95.

*Polyurethane Handbook*, Oertel, Hanser Publishers, (1985) pp. 15 and 522.

*Primary Examiner*—Jeffrey G. Mullis

[57] ABSTRACT

Compatibilizing agent being the reaction product of an organic mono- or polyfunctional isocyanate and a compound corresponding to the following general formula (I)

$$R-(O)_n-\underset{Y_1}{\overset{\parallel}{C}}-CH_2-\underset{Y_2}{\overset{\parallel}{C}}-(O)_{n'}-R' \quad (I)$$

wherein $Y_1$ and $Y_2$ (same or different) represent O or S; n and n' (same or different) represent an integer of from 0 to 1, R and R' (same or different) represent an aliphatic hydrocarbon radical containing from 1 to 30 carbon atoms and wherein the sum of the total number of carbon atoms of R and R' is between 7 and 40, and its use for improving the release performance of metal carboxylate containing polyisocyanate compositions for woodbinding.

2 Claims, No Drawings

COMPATIBILISING AGENTS

CROSS REFERENCE TO RELATED APPLICATIONS

The present application is a divisional of U.S. patent application Ser. No. 08/321,507, filed Oct. 12, 1994 which is a continuation-in-part of U.S. patent application Ser. No. 08/187,577, filed Jan. 27, 1994, now abandoned.

This invention relates to compatibilising agents for use in polyisocyanate compositions and more in particular to compatibilising agents for use in catalysed polyisocyanate compositions for use in binding lignocellulosic material.

The use of organic polyisocyanates as binders for lignocellulosic material in the manufacture of sheets or moulded bodies such as waferboard, chipboard, fibreboard and plywood is well known. In a typical process the organic polyisocyanate, optionally in the form of a solution, dispersion or aqueous emulsion, is applied to the lignocellulosic material which is then subjected to heat and pressure.

The high quality of the resulting materials is due, to a very large extent, to the excellent adhesive properties of organic polyisocyanates. At the same time, however, the excellent adhesive properties offered by a polyisocyanate creates an offsetting disadvantage in that it causes severe sticking of the lignocellulosic material to the hot metal surfaces with which it comes into contact during the hot-pressing operation. Most often the product is damaged in removing it from the press and much time is required to remove adhering cellulosic material from the surfaces of the press parts.

Several attempts have been made to overcome this adhesion problem. One of these approaches involves applying a release agent internally with the polyisocyanate. As such internal mold release agents are described compounds which catalyse the formation of isocyanurate from isocyanates (see U.S. Pat. No. 3,870,665) such as certain metal salts of carboxylic acids. Particularly efficient internal mold release agents are dialkyl tin bismaleates or zinc bismaleates as described in our copending patent application.

The problem with these metal carboxylate catalysts and in particular with the zinc based catalysts is their limited solubility in the polyisocyanate composition itself leading to unsatisfactory release performance.

Further some of these metal carboxylate containing polyisocyanate compositions are not very storage stable.

It is an object of the present invention to provide a metal carboxylate catalysed polyisocyanate composition and in particular a zinc bismaleate catalysed polyisocyanate composition that yields satisfactory release of the lignocellulosic bodies bound with said composition from the metal press surfaces without detrimentally affecting the other board properties.

It is another object of the present invention to provide a metal carboxylate catalysed polyisocyanate composition and in particular a zinc carboxylate catalysed polyisocyanate composition that is storage stable.

It is a further object of the present invention to provide a compatibilising agent to solubilise metal carboxylates and in particular zinc carboxylates in polyisocyanate compositions.

The present invention provides a compatibilising agent being the reaction product of an organic mono- or polyfunctional isocyanate and a compound corresponding to the following general formula (I)

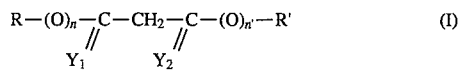

wherein $Y_1$ and $Y_2$ (same or different) represent O or S; n and n' (same or different) represent an integer of from 0 to 1, R and R' (same or different) represent an aliphatic hydrocarbon radical containing from 1 to 30 carbon atoms and wherein the sum of the total number of carbon atoms of R and R' is between 7 and 40.

The term "aliphatic hydrocarbon radical" as used herein is meant to include straight and branched chain alkyl and cycloalkyl radicals that may include unsaturated groups and/or F or Si containing groups in their chain.

Lower alkyl analogues of the compounds according to formula (I) wherein the sum of the total number of carbon atoms of R and R' is between 2 and 4 such as ethyl acetoacetate, diethyl malonate and acetylacetone are known as blocking agents for isocyanates. However reaction products of isocyanates and longer chain derivatives according to formula (I) wherein the sum of the total number of carbon atoms of R and R' is between 7 and 40 have not been described heretobefore.

Preferred compounds according to formula (I) for preparing the present compatibilising agent are those wherein the sum of the total number of carbon atoms of R and R' is between 9 and 20.

Preferably R and/or R' represent aliphatic hydrocarbon radicals containing from 4 to 30, more preferably from 8 to 22 and most preferably from 10 to 18 carbon atoms.

According to a preferred embodiment of the present invention n equals 0, R is a lower alkyl radical such as methyl, n' equals 1 and R' is an alkyl radical containing from 8 to 18 carbon atoms. According to another preferred embodiment of the present invention n and n' both equal 1 and R and R' both are alkyl radicals containing from 8 to 18 carbon atoms.

Preferably $Y_1$ and $Y_2$ both represent O and n and/or n' equals 1. Preferably n or n' equals 0 and R', respectively R, is a lower alkyl radical containing 1 to 2 carbon atoms.

Most preferred compounds according to formula (I) are decyl and stearyl acetoacetate and bis-decyl malonate.

The organic isocyanate with which the compound according to formula (I) is reacted to form the compatibilising agent of the present invention can be monofunctional as well as polyfunctional including diisocyanates and isocyanates of higher functionality. The organic isocyanate can be aliphatic, cycloaliphatic or aromatic. Polyfunctional isocyanates are preferred over monofunctional isocyanates when the compatibilising agent is to be used in polyisocyanate compositions in order to improve release performance of lignocellulosic bodies bound with said composition.

Examples of organic isocyanates which may be used in the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4,'-diisocyanate, chlorophenylene-2,4-diisocyanate, naphthyene-1, 5-dissocyanate, diphenylene-4,4'-diisocyanate, 4,4'-diisocyanate-3,3,'-dimethyldiphenyl, 3-methyldiphenylmethane-4,4'-diisocyanate and diphenyl ether diisocyanate; and cycloaliphatic diisocyanates such as cyclohexane 2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether.

Modified polyisocyanates containing isocyanurate, carbodiimide or uretonimine groups may be employed as well.

Further useful isocyanates are methylene bridged polyphenyl polyisocyanates, including diisocyanates, triisocyanates and higher polyisocyanates together with any phosgenation by-products.

Preferred isocyanates to be used to form the present compatibilising agent are aromatic diisocyanates or polyisocyanates of higher functionality such as diphenylmethane diisocyanate or mixture of methylene bridged polyphenyl polyisocyanates containing diisocyanates, triisocyanates and higher functionality polyisocyanates.

The compatibilising agents according to the present invention wherein n and/or n' equals 1, can be prepared by transesterification of lower alkyl analogues (such as ethyl acetoacetate and diethyl malonate) followed by reaction with the isocyanate usually at elevated temperature (about 80° C.) and in the presence of a catalyst.

When used in polyisocyanate compositions the present compatibilising agents can be prepared in situ, by adding the transesterified product to the polyisocyanate composition in the presence of a catalyst and optionally at elevated temperature.

The present invention also provides polyisocyanate compositions containing the present compatibilising agent, generally in amounts ranging from 0.1 to 15 parts by weight, preferably 0.1 to 10 parts by weight, more preferably 0.5 to 3 parts by weight per 100 parts by weight of polyisocyanate.

In view of its chelating effect the compatibilising agent of the present invention is especially suitable for solubilising and/or stabilising and/or dispersing (possibly in the presence of co-surfactants) metal carboxylates in polyisocyanate or polyol compositions. In particular metal carboxylates derived from metals of Group IB, IIB, IVA and VIII of the Periodic Table of Elements such as Zn, Cu, Co, Ni, Cd, Pb, Sn and Fe are difficult to solubilise in polyisocyanate compositions. Examples of particularly suitable metal carboxylates to be solubilised and/or stabilised and/or dispersed by the present compatibilising agent are zinc stearate, zinc bismaleate and dialkyl tin bismaleate.

Reaction products of organic polyisocyanates and lower alkyl analogues of compounds according to formula (I) as specified above are not suitable for solubilising these metal carboxylates.

To solubilise such metal carboxylates a particular type of compatibilising agent according to the present invention may be used or alternatively a mixture of two or more different compatibilising agents of the present invention may be used.

Some of these metal carboxylates are particularly useful as internal mold release agents in polyisocyanate compositions for binding lignocellulosic material. Examples of extremely effective internal mold release agents are the following metal carboxylates corresponding to the general formula (II) or (III)

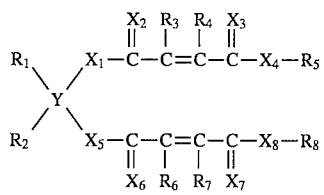
(II)

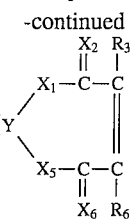
(III)

wherein

Y represents Zn, Ni, Co, Cd, Pb, Sn or Cu;

$X_1$, $X_2$, $X_3$, $X_4$, $X_5$, $X_6$, $X_7$ and $X_8$ each independently represents O or S;

$R_1$ and $R_2$ each independently represents a saturated aliphatic hydrocarbon radical having 1 to 20 carbon atoms or an aromatic ring with the proviso that $R_4$ and $R_2$ are only existing if Y is Sn(IV);

$R_3$, $R_4$, $R_6$ and $R_7$ each independently represents hydrogen or a saturated aliphatic hydrocarbon radical having 1 to 20 carbon atoms;

$R_5$ and $R_8$ each independently represents a saturated aliphatic hydrocarbon radical.

Therefore the present invention also provides a polyisocyanate composition containing a metal carboxylate according to formula (II) or (III) and a compatibilising agent as specified above.

These polyisocyanate compositions are extremely effective in minimising unwanted adhesion to caul plates, press plates and other surfaces with which the treated lignocellulosic material may come into contact. Their release performance and storage stability is improved compared to polyisocyanate compositions containing the same amount of metal carboxylate release agent but without the present compatibilising agent.

Preferred compounds according to formula (II) or (III) are dialkyl tin bismaleates such as dibutyl tin di(maleate butyl ester) and in particular zinc bismaleates such as zinc bis(isobutyl maleate). By using the zinc bismaleate compounds in combination with the present compatibilising agent the same level of release performance is obtained as for the dialkyl tin bismaleates whereas without the present compatibilising agent substantially higher loadings of the zinc compounds were necessary compared to the tin compounds in order to obtain the same level of release performance. The zinc compounds have further advantages over the tin compounds in terms of storage stability, pot life and moisture resistance, as mentioned above.

These maleate compounds can be prepared by methods known in the art, like for example for the tin compounds by the reaction of a dialkyltin dihalogenide with alkali salts of carboxylic acids and for the zinc compounds by ringopening of maleic anhydride in the presence of an alcohol followed by reaction with zinc oxide and removal of water.

The polyisocyanates for use in the composition of the present invention may be any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality.

Examples of organic polyisocyanates which may be used in the composition of the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'- diisocyanate-3,3'-dimethyldiphenyl, 3-methyldiphenylmethane-4, 4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and m and triisocyanates such as 2,4,6triisocyanatotoluene and 2,4,4-triisocyanatodiphenylether.

Modified polyisocyanates containing isocyanurate, carbodiimide or uretonimine groups may be employed as well. Further blocked polyisocyanates, like the reaction product of a phenol or an oxime and a polyisocyanate, may be used, having a deblocking temperature below the temperature applied when using the polyisocyanate composition. The organic polyisocyanate may also be an isocyanate-ended prepolymer made by reacting an excess of a diisocyanate or higher functionality polyisocyanate with a polyol.

Water-emulsifiable organic polyisocyanates like those described in UK patent no. 1,444,933, in European patent publication no. 516361 and in PCT patent publication no. 91/03082 can also be used.

Mixtures of isocyanates may be used, for example a mixture of tolylene diisocyanate isomers such as the commercially available mixtures of 2,4-and 2,6-isomers and also the mixture of di- and higher polyisocyanates produced by phosgenation of aniline/formaldehyde condensates.

Such mixtures are well-known in the art and include the crude phosgenation products containing methylene bridged polyphenyl polyisocyanates, including diisocyanate, triisocyanate and higher polyisocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or mixture of methylene bridged polyphenyl polyisocyanates containing diisocyanates, triisocyanates and higher functionality polyisocyanates. Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI.

Preferably the polyisocyanate is liquid at room temperature.

The polyisocyanate composition of the present invention generally contains the compound corresponding to general formula (II) or (III) in amounts ranging from 0.1 to 10 parts by weight, preferably 0.5 to 7 parts by weight and more preferably 0.75 to 5 parts by weight and most preferably 0.75 to 3 parts by weight per 100 parts by weight of polyisocyanate.

In order to further improve the storage stability of the polyisocyanate composition of the present invention an inert diluent may be added to the composition. Suitable diluents include plasticizers of the type mentioned in "Taschenbuch der Kunststoff-Additive", Ed. by R. Gachter and H. Muller, Carl Hanser Verlag Munchen, third edition, 1989. Preferred diluents are phthalates, aliphatic carboxylates, fatty acid esters, Linseed oil and Soybean oil. A particularly preferred diluent is Priolube 1403 available from Unichema being a methyl oleate. These diluents are added in amounts of from 0 to 30 parts by weight per 100 parts by weight of polyisocyanate and preferably in amounts of from 5 to 15 parts by weight per 100 parts by weight of polyisocyanate.

In the case of Y being Zn a suitable solvent for the Zn compound may be added such as dimethyl maleate esters.

The composition further may comprise conventional additives like flame retardants, lignocellulosic preserving agents, fungicides, waxes, sizing agents, fillers, surfactants and other binders like formaldehyde condensate adhesive resins.

The polyisocyanate composition of the present invention is preferably made by first dissolving the compatibilising agent, preferably predissolved in the diluent, in the polyisocyanate and adding thereto by simple mixing the metal carboxylate, optionally in the form of a solution. Mixing can be done at ambient or elevated temperatures.

The present invention is also concerned with a process for preparing lignocellulosic bodies by bringing lignocellulosic parts into contact with the present polyisocyanate composition and by pressing this combination.

Therefore the present invention also provides a process for binding lignocellulosic material comprising the steps of a) bringing said lignocellulosic material in contact with the present polyisocyanate composition and b) subsequently allowing said material to bind.

The lignocellulosic bodies are prepared by bringing the lignocellulosic parts into contact with the polyisocyanate composition like by means of mixing, spraying and/or spreading the composition with/onto the lignocellulosic parts and by pressing the combination of the polyisocyanate composition and the lignocellulosic parts, preferably by hot-pressing, normally at 150° C. to 220° C. and 2 to 6 MPa specific pressure.

Such binding processes are commonly known in the art.

In waferboard manufacture the lignocellulosic material and the polyisocyanate composition may be conveniently mixed by spraying the present polyisocyanate composition on the lignocellulosic material while it is being agitated.

The lignocellulosic material after treatment with the polyisocyanate composition is placed on caul plates made of aluminium or steel which serve to carry the furnish into the press where it is compressed to the desired extent usually at a temperature between 150° C. and 220° C. At the start of a manufacturing run it may be helpful, but not essential, to condition the press plates by spraying their surfaces with an external release agent. The conditioned press may then be used many times in the process of the invention without further treatment.

While the process is particularly suitable for the manufacture of waferboard known extensively as oriented strand board and will be largely used for such manufacture, the process may not be regarded as limited in this respect and can also be used in the manufacture of medium density fiberboard, particle board (also known as chipboard) and plywood.

Thus the lignocellulosic material used can include wood strands, woodchips, wood fibers, shavings, veneers, wood wool, cork, bark, sawdust and like waste products of the wood working industry as well as other materials having a lignocellulosic basis such as paper, bagasse, straw, flax, sisal, hemp, rushes, reeds, rice hulls, husks, grass, nutshells and the like. Additionally, there may be mixed with the lignocellulosic materials other particulate or fibrous materials such as mineral fillers, glass fiber, mica, rubber, textile waste such as plastic fibers and fabrics.

Although the process of the present invention seems particularly suitable for binding lignocellulosic material originating from Aspen wood it also works with lignocellulosic material orginating from other types of wood such as Pine or Spruce.

When the polyisocyanate composition is applied to the lignocellulosic material, the weight ratio of polyisocyanate/ lignocellulosic material will vary depending on the bulk density of the lignocellulosic material employed. Therefore, the polyisocyanate compositions may be applied in such amounts to give a weight ratio of polyisocyanate/lignocellulosic material in the range of 0.1:99.9 to 20:80 and preferably in the range of 0.5:99.5 to 7.0:93.

If desired, other conventional binding agents, such as formaldehyde condensate adhesive resins, may be used in conjunction with the polyisocyanate composition.

More detailed descriptions of methods of manufacturing waferboard and similar products based on lignocellulosic material are available in the prior art. The techniques and equipment conventionally used can be adapted for use with the polyisocyanate compositions of the present invention.

The sheets and moulded bodies produced from the polyisocyanate compositions of the present invention have excellent mechanical properties and they may be used in any of the situations where such articles are customarily used.

The invention is illustrated but not limited by the following examples.

EXAMPLE 1

Preparation of the Compatibilising Agent

EXAMPLE 1a

Preparation of
Bis(decanato-aceto-carbamato-phenyliden)Methane 158.3 g n-decylalcohol was mixed and mechanically stirred in a glass vessel with 162.7 g ethylacetoacetate and 0.01 g titanium(IV) n-butoxide catalyst. Subsequently the reaction mixture was heated up to 130° C. and the formed ethanol was distilled off over a period of about 4 hours (yield of ethanol was 55 ml (94%)). Thereafter the excess ethylacetoacetate was removed under reduced pressure (20 mm Hg) at 100° C. The final product n-decylacetoacetate was stored at ambient temperature under a nitrogen blanket.

100 g MDI SUPRASEC MPR (available from Imperial Chemical Industries) was mixed and mechanically stirred in a glass vessel at 80° C. under nitrogen atmosphere with 194.6 g n-decylacetoacetate and 2 g of a 60 wt % solution of zinc bisisobutylmaleate in methylenechloride. Adduct formation was monitored by IR analysis of the reaction mixture via the disappearance of the NCO vibration band at 2270 $cm^{-1}$. The reaction was completed after about 8 hours. Subsequently the product was allowed to cool down to ambient temperature and stored under a nitrogen blanket at 23° C.

EXAMPLE 1b

Preparation of
Bis(didecanato-carbamato-polyphenyliden)Methane 316.6 g n-decylalcohol was mixed and mechanically stirred in a glass vessel with 160.17 g diethylmalonate and 0.02 g titanium(IV) n-butoxide catalyst. Subsequently the reaction mixture was heated up to 130° C. and the formed ethanol was distilled off over a period of about 4 hours (yield of ethanol was 110 ml (94%)). The final product di-n-decylmalonate was stored at ambient temperature under a nitrogen blanket. 50 g p-MDI SUPRASEC X2185 (available from Imperial Chemical Industries) was dissolved in 100 ml toluene and added dropwise to a stirred solution of 141.6 g di-n-decylmalonate in 200 ml toluene, containing 0.75 g sodium methanolate. The addition was carried out at ambient temperature under nitrogen atmosphere in a glass vessel.

After completion of the isocyanate addition the reaction mixture was heated up to 80° C. for 3 hours. IR analysis of the reaction mixture then showed a complete disappearance of the NCO vibration band at 2270 $cm^{-1}$ and the reaction mixture was allowed to cool down to ambient temperature. Subsequently the sodium catalyst was filtered off. Excess toluene was removed under reduced pressure (30 mm Hg) at 60° C. The final product was stored at ambient temperature under a nitrogen blanket.

EXAMPLE 2

Preparation of the Polyisocyanate Binder Composition 2 g of the compatibilising agent prepared in example 1a above was dissolved in 30 g methyloleate (Priolube 1403 available from Unichem Chemicals) at 80° C. in a glass vessel under nitrogen atmosphere and with mechanical stirring. Thereafter the solution was allowed to cool down to ambient temperature and mixed with 200 g polyisocyanate SUPRASEC X2185 (available from Imperial Chemical Industries) at ambient temperature in a glass vessel. Thereafter 10 g of a 40 wt % solution of zinc-bisisobutylmaleate in dimethylmaleate was added to this mixture and stirring was continued for 15 minutes. The resultant binder composition was stored at ambient temperature under a nitrogen blanket.

EXAMPLE 3

Release Performance of the Polyisocyanate Binder Composition 3 kg of air dry Aspen strands with a moisture content of 6.8% were blended first with 70 g of a wax dispersion (Paracol 810 N-40, manufactured by Hercules) and then with 109 g of the polyisocyanate binder composition as described and prepared in Example 2 above by air atomised spray application in a drum blender.

On a pre-heated, 2 mm thick, clean, solvent wiped caul platen made from mild carbon steel (which was coated with the permanent release coating ISOSTRIP 23, distributed by Imperial Chemical Industries, in order to make the evaluation of the release from the upper caul platen easier) a mat was formed with the dimensions of 300 +300 mm by using 337 g of the treated strands. The mat on the caul platen was transferred to a heatable hydraulic press which was modified in such a way that the upper caul platen is fixed to the top press platen. Prior to use the upper caul platen was thoroughly cleaned by sand blasting with glass beads and degreased by solvent wiping.

Within 30 seconds the press was closed to stops and the mat was consolidated to a thickness of 6 mm for 96 seconds at a temperature of 200° C. and a specific pressure of 2.45 MPa. After 15 seconds decompression the press opened and the board remained on the lower caul platen and could be taken off without applying of force.

This process could be repeated several times without taking off and cleaning the upper caul platen.

As comparison the experiment was repeated using instead of the polyisocyanate composition of example 2 a polyisocyanate composition comprising the same amount of Zn-isobutylmaleate but not containing the present bis(decanato-aceto-carbamato-phenyliden)methane compatibilising agent.

Following the instructions given above the resulting board did not release as well. Some force was required to remove the board from the upper caul platen and there were some wood pieces still sticking on the surface of the platen.

As another comparison the experiment was repeated using instead of the polyisocyanate composition of example 2 a polyisocyanate composition comprising the same amount of compatibilising agent but not containing the zinc-bismaleate catalyst.

Following the instructions given above the resulting board did not release as well. The board could not be removed from the upper caul platen without destruction.

EXAMPLE 4

Physical Properties of the Manufactured Boards

Three layer OSB (Oriented Strand Board) was made by blending the strands for the face layers as described in example 3 above but using 118.5 g of binder composition of example 2. For the core layer the same blending and wax addition procedure was used but 78 g of Suprasec DNR (available from Imperial Chemical Industries) were applied as binder composition. On a pre-heated, 2 mm thick, clean, solvent wiped caul platen made from mild carbon steel (which was coated with the permanent release coating ISOSTRIP 23, distributed by Imperial Chemical Industries) a mat was formed with the dimensions of 300×300 mm by using first 185 g of the treated strands dedicated for the face layer, followed by 248 g of treated strands for the core layer and finally again 185 g of face layer strands. The mat on the caul platen was transferred to a heatable hydraulic press which was modified as described in example 3.

Within 30 seconds the press was closed to stops and the mat was consolidated to a thickness of 11 mm for 176 seconds at a temperature of 200° C. and a specific pressure of 2.45 MPa. After 15 seconds decompression the press opened and the board could be taken out.

The internal bond strength (measured according to standard DIN 52365) was between 488 and 595 kPa and the thickness swell after 24 hours water immersion (measured according to standard DIN 52364) was 20%.

As comparison the experiment was repeated using for the face layers instead of the polyisocyanate composition of example 2 a polyisocyanate composition comprising the same amount of Zn-isobutylmaleate but not containing the present bis(decanato-aceto-carbamato-phenyliden)methane compatibilising agent.

The internal bond strength was between 536 and 556 kPa and the thickness swell was 21%.

This experiment shows that the physical properties of the boards manufactured with the present polyisocyanate binder composition containing the compatibilising agent are not detrimentally influenced.

EXAMPLE 5

Storage Stability of the Polyisocyanate Composition

A polyisocyanate composition comprising 100 pbw of polyisocyanate (SUPRASEC DNR available from Imperial Chemical Industries), 5 pbw of a 40 wt % solution of zinc(isobutylmaleate) in dimethylmaleate, 1 pbw of bis(decanato-aceto-carbamato-phenyliden)methane and 15 pbw of methyloleate was prepared according to the procedure described in example 2 above (referred to below as ISO 1).

Viscosity increase of this composition (expressed in cPoise) over the next days was followed (viscosity at ambient temperature measured using a Brookfield DV-II viscometer). Results are presented in Table 1 below.

For comparison the same experiment was repeated with a similar polyisocyanate composition but not containing bis-(decanato-aceto-carbamato-phenyliden)methane (referred to below as ISO 2).

TABLE 1

|  | ISO 1 | ISO 2 |
|---|---|---|
| viscosity after 0 days | 110 | 110 |
| viscosity after 10 days | 187 | 985 |
| viscosity after 20 days | 230 | 4500 |
| viscosity after 30 days | 280 | — |
| viscosity after 40 days | 340 | — |
| viscosity after 50 days | 400 | — |

This experiment shows that the storage stability of polyisocyanate compositions according to the present invention (ISO 1) is much improved compared to the known polyisocyanate compositions (ISO 2).

EXAMPLE 6

Comparison with Lower Alkyl Analogues

An attempt was made to prepare a polyisocyanate composition similar to that of example 2 but comprising instead of bis(decanato-aceto-carbamato-phenyliden)methane as compatibilising agent the reaction product of SUPRASEC X2185 and ethylacetoacetate. This latter reaction product did not dissolve in the polyisocyanate composition so this compound cannot be used as a compatibilising agent to solubilise metal carboxylates.

We claim:

1. A process for solubilizing metal carboxylates in polyisocyanate or polyol compositions comprising: (1) adding to said polyisocyanate or polyol composition a preformed compatibilizing agent which is the reaction product of an organic mono-or polyfunctional isocyanate and a compound corresponding to the following general formula (I):

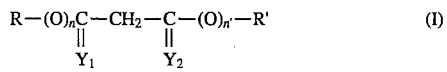

wherein $Y_1$ and $Y_2$ may be the same or different and represent O or S, n and n' may be the same or different and represent an integer of from 0 to 1, and R and R' may be the same or different and represent an aliphatic hydrocarbon radical containing 1 to 30 carbon atoms, wherein the sum of the total number of carbon atoms of R and R' is between 7 and 40; and (2) adding the metal carboxylate to said polyisocyanate or polyol composition.

2. A process according to claim 1 wherein the metal carboxylate is derived from a metal selected from the group consisting of Group IB, IIB, IVA and VIII of the Periodic Table of Elements.

* * * * *